United States Patent
Collins, IV

(10) Patent No.: US 7,100,765 B2
(45) Date of Patent: Sep. 5, 2006

(54) LATCHING MECHANISM FOR EXPANDABLE CD CARRYING CASE

(75) Inventor: Henry L. Collins, IV, Maynard, MA (US)

(73) Assignee: Swing Limited, Concord, MA (US)

( * ) Notice: Subject to any disclaimer, the term of this patent is extended or adjusted under 35 U.S.C. 154(b) by 156 days.

(21) Appl. No.: 10/817,017

(22) Filed: Apr. 2, 2004

(65) Prior Publication Data

US 2005/0218017 A1    Oct. 6, 2005

(51) Int. Cl.
*B65D 85/57*    (2006.01)
(52) U.S. Cl. ............ 206/308.1; 206/312; 206/472
(58) Field of Classification Search ......... 206/472, 206/474, 308.1, 312–313; 281/34, 45; 150/143; 190/902
See application file for complete search history.

(56) References Cited

U.S. PATENT DOCUMENTS

| | | | | |
|---|---|---|---|---|
| 932,205 A | * | 8/1909 | Wentz | 150/143 |
| 1,923,081 A | * | 8/1933 | Elsner | 281/36 |
| 2,651,346 A | * | 9/1953 | Nash | 150/143 |
| 2,727,549 A | * | 12/1955 | Knee | 150/143 |
| 4,332,338 A | * | 6/1982 | Christiansen | 150/143 |
| 6,186,332 B1 | * | 2/2001 | Combs | 206/308.1 |

* cited by examiner

*Primary Examiner*—Bryon Gehman
(74) *Attorney, Agent, or Firm*—Robert K. Tendler

(57) ABSTRACT

A latching mechanism for an expandable CD book which expands with the insertion of CD disks includes a spring-loaded strap which is anchored at one end through a stretchable elastic web to one cover of the CD book and which is anchored to the other cover of the CD book through a snap arrangement. When the CD book is filled, the top and bottom covers of the CD book are more separated, which increased distance is accommodated through the extension of one end of the strap made possible by stretchable elastic webbing. When the strap is looped around the expanded book and is attached by the snap, the increased thickness of the book is taken into account by the extension of the strap, with the strap being secured tightly in place around the expanded book by virtue of the stretchable webbing which is anchored at one end to one cover of the book.

16 Claims, 5 Drawing Sheets

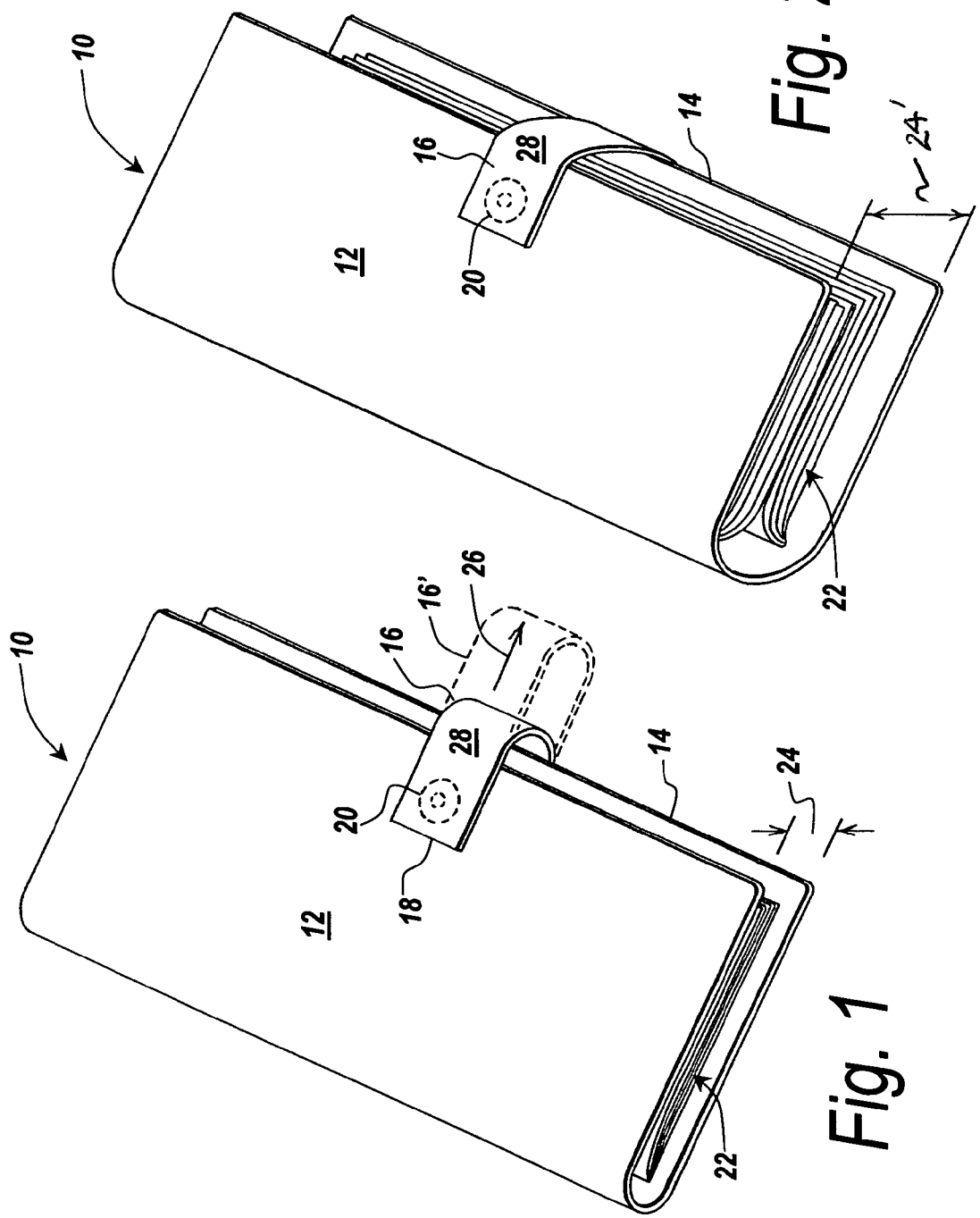

LATCHING MECHANISM FOR EXPANDABLE CD CARRYING CASE

FIELD OF THE INVENTION

This invention relates to expandable books and more particularly to an expandable book which is held in a closed position through the utilization of a spring-loaded strap which has one end attached to a stretchable web anchored to one cover of the book.

BACKGROUND OF THE INVENTION

With the growth of the CD market, there exists a need for CD holders to accommodate numbers of CDs. CDs have been held in CD holders which exist in book form such that when the book is opened a number of envelopes are provided into which CDs may be inserted.

As the number of CDs increases in the book, the book expands such that the thickness of the book increases. It is desirable to have a locking mechanism which will hold the covers of the book together in a closed position for transport, whereas for use, the latching mechanism is to be released to allow the book to open up and lie flat, thus exposing the CDs carried in the envelopes within the book.

SUMMARY OF INVENTION

In order to secure the covers of the book in a closed position when loaded with CDs, in the subject invention a spring-loaded strap is provided with an extensible distal portion, which in one embodiment includes a stretchable elastic web, with the distal end of the web secured to the back cover of the book.

When the book is empty of CDs or when there are only a few CDs in the envelopes provided in the book, the subject latching mechanism holds the book halves together tightly due to the spring action of the stretchable web at the distal end of the strap. The proximal end of the strap may be provided with a snap so that it may be secured to the other cover of the book.

When numbers of CDs are loaded into the envelopes within the covers of the book, the strap extends from one cover of the book by virtue of stretching the elastic web, whereupon it is elongated sufficiently to overlie the expanded aperture between the covers of the closed book, thence to hold the book halves together in an elastic fashion. Note that in one embodiment the strap is relatively unextensible, with the web portion being hidden in the book binding. This permits elongation of the otherwise unextendable strap portion so as to be able to effect closure of the book without exposing the spring-loading mechanism.

In one embodiment, the end of the strap attached to the web has a T-shaped section that prevents the distal end of the strap from coming out of the cover to which it is attached due to the cooperation of this T-shaped section with a reduced-size slot that exists in the cover of the book to which the distal end of the strap is adhered.

Thus, one cover of the book is provided with a slot in it through which the strap portion extends. When it is desired to extend the strap by pulling on the elastic web, the strap pulls through the slot in the cover, but only until such time as the T-shaped section co-acts as a detent with this slot to prevent the strap from falling out or to prevent any portion of the web from exiting the slot where it would be visible.

In this manner, the book of CDs can be securely closed and latched by a spring-loaded strap which is elongatable to accommodate a change in the thickness of the book. The elongatability comes from the anchoring of the distal end of an inextensible strap to a stretchable web or other elastic material, with the distal end of the web being anchored to the book backing material, either adhesively or otherwise.

In one embodiment, the web is secured to the distal end of the strap by stitching, with a double row of stitching utilized at the distal end of the strap to secure the distal end of the strap to the webbing.

While the subject invention is described in connection with an extensible CD holder, the subject invention applies equally well to any type of book which is allowed to expand and for which a closure mechanism is desired.

In summary, latching mechanism for an expandable CD book which expands with the insertion of CD disks includes a spring-loaded strap which-is anchored at one end through a stretchable elastic web to one cover of the CD book and which is anchored to the other cover of the CD book through a snap arrangement.; When the CD book is filled, the top and bottom covers of the CD book are more separated, which increased distance is accommodated through the extension of one end of the strap made possible by stretchable elastic webbing. When the strap is looped around the expanded book and is attached by the snap, the increased thickness of the book is taken into account by the extension of the strap, with the strap being secured tightly in place around the expanded book by virtue of the stretchable webbing which is anchored at one end to one cover of the book.

BRIEF DESCRIPTION OF THE DRAWINGS

These and other features of the subject invention will be better understood in connection with a Detailed Description, in conjunction with the Drawings, of which:

FIG. 1 is a diagrammatic illustration of a closed expandable book showing a closing strap which is elongatable by drawing a portion of it out from the bottom cover of the book;

FIG. 2 is a diagrammatic illustration of the expandable book of FIG. 1, illustrating the book in its expanded condition with the strap in place to close the covers of the book;

DETAILED DESCRIPTION

Figure 3:
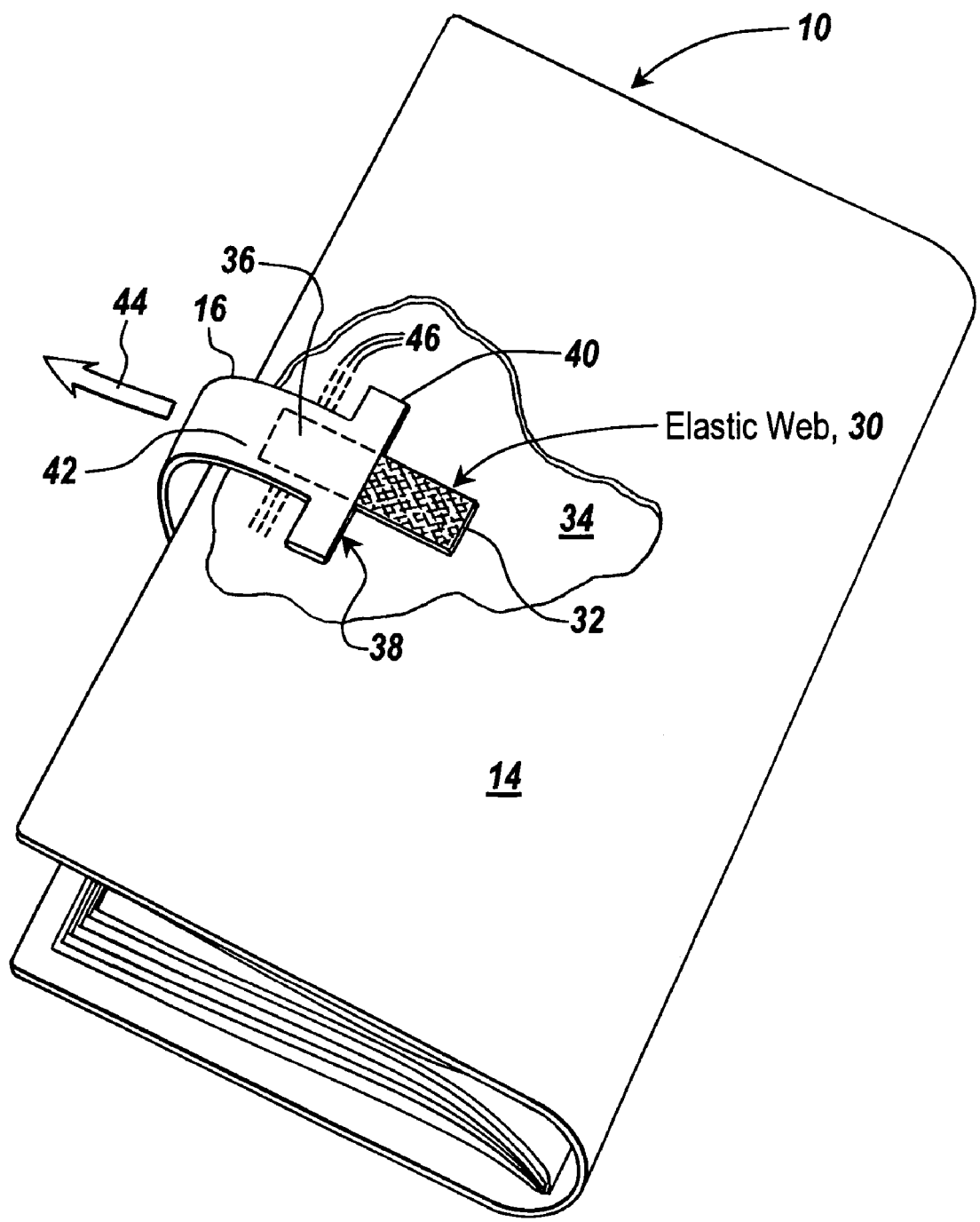
FIG. 3 is an isometric view of the back cover of the book of FIGS. 1 and 2, with the cover thereof removed to expose a strap anchored to an underlying back cover material by use of an elastic web.

Referring to FIG. 1, an expandable book 10 is shown having a top cover 12 and a bottom cover 14 in which, in the closed position, the covers are secured together by a spring-loaded strap 16 that runs from the back cover of the book to the front cover where it is secured at its proximal end 18 via a snap arrangement 20 shown in dotted outline.

The book is shown with a number of leaves 22 within the covers of the book, with the leaves in one embodiment including pockets adapted to receive CD ROM disks. With no disks in the envelopes or leaves, the aperture 24 of the closed book is illustrated by the double-ended arrow 24.

As illustrated by dotted outline 16', when the book is expanded by filling the envelopes or adding new leaves, the distal end of strap 16 may be pulled out from the bottom cover of book 10 as illustrated by arrow 26 so that, as illustrated in FIG. 2, strap 16 fits snugly about the expanded aperture 24' to facilitate closure of book 10 by securing cover 14 to cover 12. Here it can be seen that due to the elongation of the spring-loaded strap 16 the book can be conveniently secured by a strap which initially has a portion 28 that is non-elastic.

Referring to FIG. 3, strap 16 is spring-loaded by an elastic member 30 in the form of a web which is secured at its distal end 32 to an underlying cover member 34.

The proximal portion 36 of web 30 is secured to the distal portion 38 of strap 16. Here distal portion 38 of strap 16 is provided with a T-shaped portion 40 to prevent the distal portion of strap 16 from exiting a slot 42. Note that strap 16 is carried in slot 42, which is in cover 14 of book 10.

Due to the elasticity of web 30 and its stretchable nature, strap 16 may be pulled in the direction of arrow 44 such that T-shaped portion 40 of the distal end 38 of strap 16 moves as illustrated by dotted lines 46 until the T-shaped portion co-acts with slot 42, as will be shown hereinafter.

Figure 4:
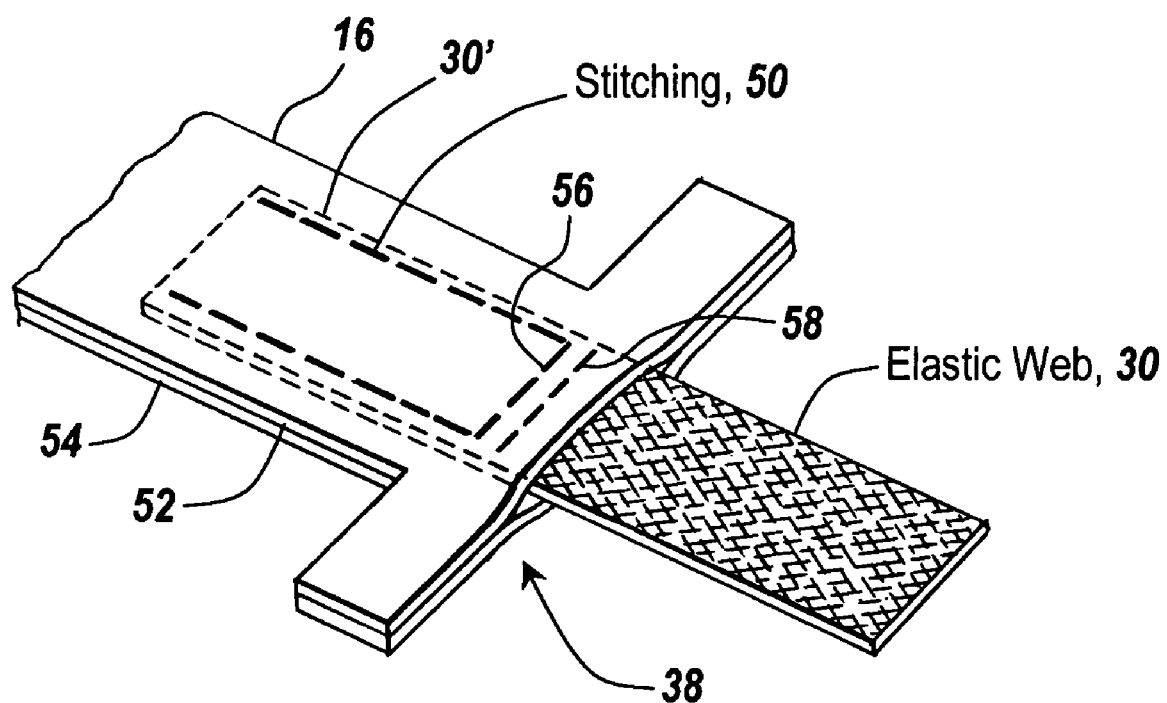
FIG. 4 is a diagrammatic illustration of a portion of the strap of FIG. 3, showing a T-shaped distal end of the strap and stitching utilized to secure the elastic web to the strap.

Referring to FIG. 4, distal portion 38 of strap 16 is secured to elastic web 30 via stitching 50 which stitches an internal portion 30' of web 30 to two opposed sheets 52 and 54 of strap 16.

Stitching 50 at the distal end 38 of strap 16 includes a double row of stitches 56 and 58 for increased security when elastic web 30 is stretched as strap 16 is pulled out of slot 42.

Figure 5:
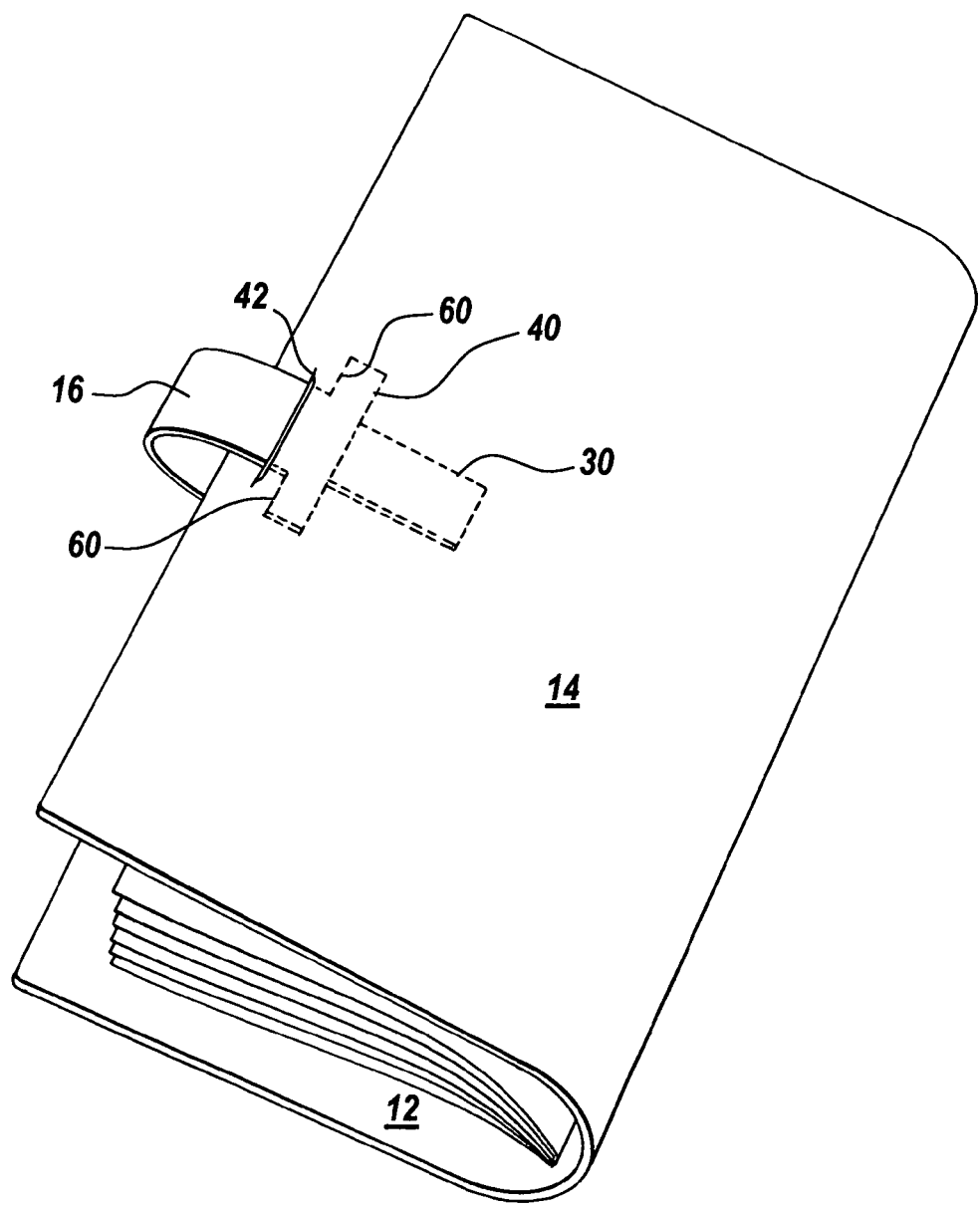
FIG. 5 is a diagrammatic illustration of the detent action of the T-shaped distal portion of the strap with a slot in the back cover of the book of FIG. 1, illustrating that the slot, while permitting the strap to move outwardly with stretching of the web, limits the movement of the strap outwardly from the slot by virtue of the detent action of the T-shaped portion with the slot; and, FIG. 6 is a diagrammatic illustration of the opened book showing envelopes or pockets for the carrying of CDs.

Referring to FIG. 5, spring-loaded strap 16 is shown to emerge from slot 42 of cover 14, with T-shaped distal end 40 shown in dotted outline. Here it can be seen that the leading edge 60 of T-shaped portion 40 co-acts with slot 42 to limit the outward pull of strap 16 from cover 14.

Figure 6:
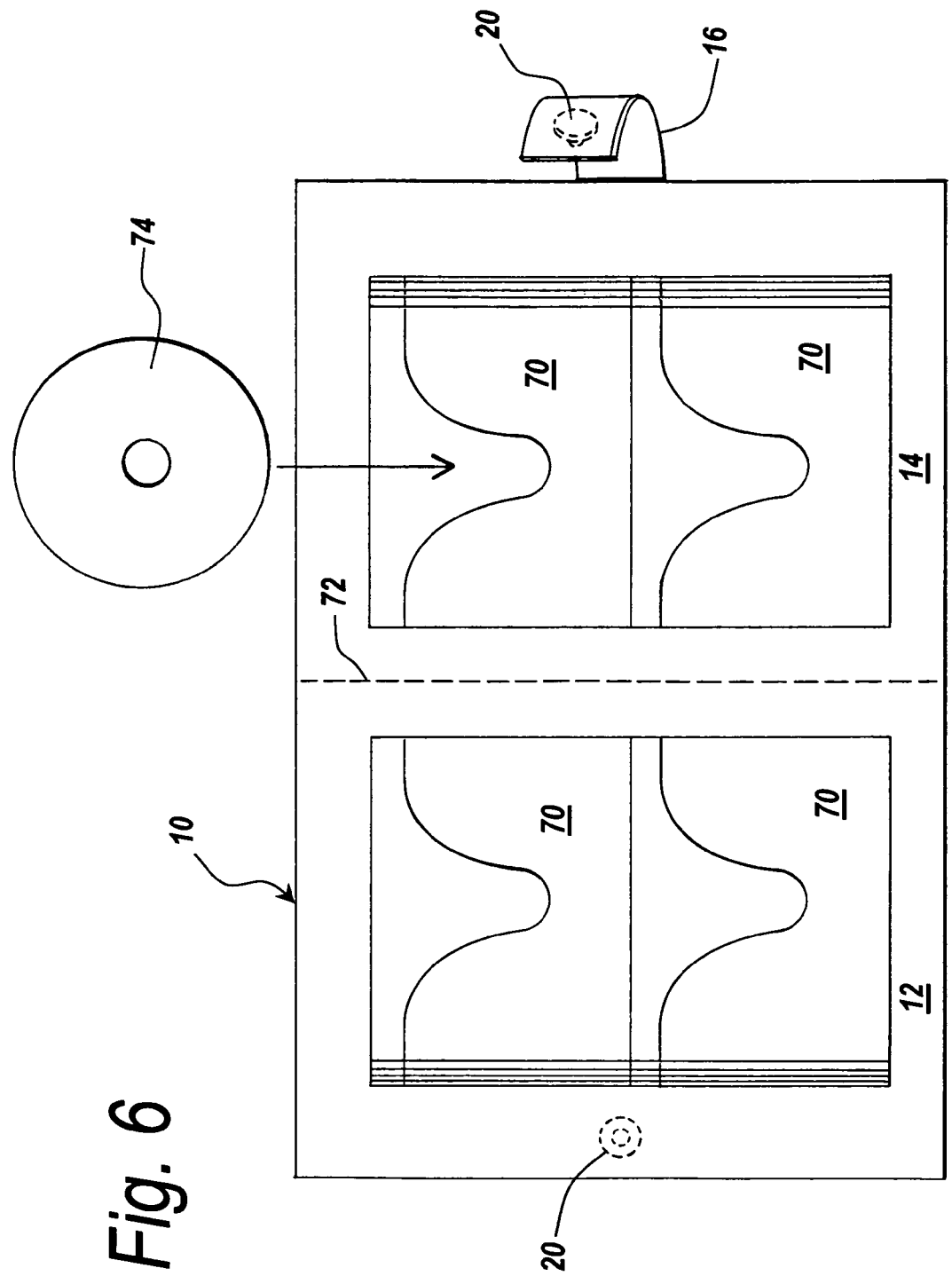

Referring to FIG. 6, book 10 is shown opened to expose a number of envelopes 70 to either side of a center line 72 of book 10. Here a CD disk 74 is shown insertable into envelope 70 for the storage thereof.

In summary, what is shown is an expandable book which expands depending on the number of leaves inserted into the book or the amount of material inserted into pockets within the leaves, with the book being closeable and securable by a spring-loaded strap 20, which in one embodiment is spring-loaded by an elastic web that connects the distal end of the strap to the back cover of the book.

In one embodiment, the strap has a detent portion in the form of a T-shaped structure, which co-acts with a slot within the back cover of the book so as to prevent the strap from being removed from the back cover to such an extent that it would expose the elastic web. Thus, the T-shaped member forming a detent prevents an unsightly elastic web from exiting the slot in the back cover.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. Apparatus for securely carrying a variable number of compact discs between nonflexible covers of an expandable CD case, comprising:
   a compact disc carrying case having a nonflexible front cover a nonflexible back cover and a space therebetween;
   a number of sleeves located between said covers each for carrying a compact disc, each sleeve having a slot to effectuate removal of the associated compact disc therefrom;
   a hinge between said covers, said sleeves being exposed at three sides of said case; and,
   a spring-loaded strap having a distal end secured to said back cover and a proximal end releasably securable to said front cover, said strap adapted to overlie said space between said covers to secure said covers together so that the covers secure and squeeze the compact discs from movement and prevent damage to the compact discs regardless of the number of compact discs carried between the covers.

2. The apparatus of claim 1, wherein said strap includes an elastic member secured at the proximal end to the distal portion of said strap and at a distal end thereof to said back cover.

3. The apparatus of claim 1, wherein said back cover includes a backing member and a covering having a slot therein, and wherein said strap has a detent co-acting with said slot, said strap extending through said slot, the co-action of said detent with said slot slidably restraining said strap from removal therefrom.

4. The apparatus of claim 3, wherein said strap includes a detent at the distal end thereof, said detent co-acting with said slot to limit the movement of the distal end of said strap.

5. The apparatus of claim 4, wherein said detent is T-shaped.

6. The apparatus of claim 1, wherein said spring-loaded strap includes a web.

7. The apparatus of claim 6, wherein said web is secured to the distal end of said strap.

8. The apparatus of claim 7, wherein said web is secured to the distal end of said strap by double stitching.

9. The apparatus of claim 1, wherein said strap is unextensible such that said strap is extensible only by the spring loading thereof.

10. A method for securely carrying a variable number of compact discs between front and back covers of a compact disc case, comprising the steps of:
    providing a compact disc case having front and back nonflexible covers hinged together such that three free edges of the covers are exposed;
    locating a number of compact discs carrying sleeves between the covers; and,
    providing a spring-loaded strap having a distal end secured to a back cover of the case and a proximal end releasably attachable to the front cover of the case, the spring loading permitting extension of the strap to accommodate expansion of the case due to increasing numbers of compact discs carried therein, such that the spring loading of the covers together securely sandwiches the sleeves to clamp the compact disc together in their sleeves to prevent damage to the compact discs.

11. The method of claim 10, and further including the step of hiding the spring-loading portion of the strap when the strap is extended.

12. The method of claim 11, wherein the back cover of the case is provided with a slot through which the strap extends.

13. The method of claim 12, wherein the back cover of the case covers the spring-loaded portion of the strap.

14. The method of claim 13, wherein the spring-loaded portion of the strap is prevented from being pulled out of the slot through which it extends.

15. A CD holder comprising:

an expandable case having leaves therein provided with CD receiving pockets, said case having spaced-apart respective front and back covers; and, a spring-loaded strap having a distal end secured to said back cover and a proximal end releasably securable to said front cover, said strap adapted to overlie the space between said covers to secure said covers together, said spring-loaded strap causing the secure sandwiching of said leaves together regardless of the number of CDs within the case, thereby to prevent CD damage.

16. The CD holder of claim 15, wherein said strap includes an elastic member at said distal end.

* * * * *